United States Patent [19]

Edwards

[11] Patent Number: 4,967,065

[45] Date of Patent: Oct. 30, 1990

[54] INTEGRATED RETICLE AND DETECTOR

[75] Inventor: Byron Edwards, Orange, Calif.

[73] Assignee: Ford Aerospace Corporation, Newport Beach, Calif.

[21] Appl. No.: 392,676

[22] Filed: Aug. 11, 1989

[51] Int. Cl.[5] .......................... G01J 1/20; F41G 7/00
[52] U.S. Cl. ................................. 250/203.6; 244/3.16
[58] Field of Search ............... 250/203.7, 203.6, 203.3, 250/211 J, 206.1, 206.2, 203.1; 244/3.16, 3.13; 356/141, 152

[56] References Cited

U.S. PATENT DOCUMENTS

| | | | |
|---|---|---|---|
| 2,981,843 | 4/1961 | Hanson | 250/203.7 |
| 3,076,095 | 1/1963 | Becklund et al. | 244/3.16 |
| 3,173,019 | 3/1965 | Wormser | 250/203.7 |
| 3,244,887 | 4/1966 | Lozins | 250/203.6 |
| 3,259,751 | 7/1966 | Sachs | 250/203.7 |
| 3,353,022 | 11/1967 | Schwartz | 250/83.3 |
| 3,381,133 | 4/1968 | Barnes et al. | 250/203.6 |
| 3,455,243 | 7/1969 | Martin | 244/3.16 |
| 3,642,233 | 2/1972 | Bezerie | 244/3.16 |
| 3,835,749 | 9/1974 | Joneaux | 244/3.16 |
| 3,872,308 | 3/1975 | Hopson et al. | |
| 3,944,167 | 3/1976 | Figler et al. | |
| 4,561,611 | 12/1985 | Sinclair et al. | 244/3.16 |
| 4,639,589 | 1/1987 | Weber et al. | 250/203.6 |
| 4,703,167 | 10/1987 | Okumura et al. | 356/141 |

Primary Examiner—David C. Nelms
Assistant Examiner—Michael Messinger
Attorney, Agent, or Firm—Harry G. Weissenberger; Edward J. Radlo; Keith L. Zerschling

[57] ABSTRACT

The electronic simplicity of a rotating-telescope target acquisition device and the noise immunity and wide field of view of a non-rotating array device are combined in an assembly (10) using a rotating refractory telescope (21) on a gimbaled platform (28), and a combination reticle (38) and detector (34) on the same platform (28). The detector (34) is segmented (50) to detect the direction in which a target is substantially off the telescope's optical axis (32), and the detector (34) is also shielded (35) against any radiation coming from outside the optical path of the telescope (21). The reticle (38) also serves as the electrical connection (42,62) between the detector segments (40,50) and the contact pads (44,64) on the detector plate (36).

6 Claims, 3 Drawing Sheets

INTEGRATED RETICLE AND DETECTOR

FIELD OF THE INVENTION

This invention relates to optical target acquisition devices, and more particularly to a combined reticle and detector which provides a wider field of view and greater noise rejection.

BACKGROUND OF THE INVENTION

One type of conventional optical target acquisition device uses a gimbaled rotating optical system with a reflective telescope whose optical axis is parallel to, but offset from, the axis of rotation of the optical system. The target image is projected onto a single detector through a spoke-like reticle coaxial with the axis of rotation. The reticle is positioned on the gimbal and moves with it, but the detector is off the gimbal and stationary. If the target is on the axis of rotation, the detector sees light pulses of a constant frequency. If the target drifts off-axis, a frequency modulation becomes superimposed upon the pulses. This frequency modulation is demodulated and used to move the gimbals so as to realign the axis of rotation with the target. Similar mechanisms also exist that use an amplitude modulation reticle.

Another conventional type of target acquisition device uses a gimbaled but non-rotating optical system and an array of photodetectors (e.g. 128×128) in which the location of the target image with respect to the center of the optical axis can be electronically determined.

The rotating type of device is electronically much simpler than the array type but it has a restricted field of view (when the target image is outside the reticle, there is no target information at all), and is highly noisy because stray light can enter the detector system from an almost 180° field.

Prior art in this technology includes U.S. Pat. No. 3,353,022 tro Schwartz which describes a non-tracking IF search system with a reticle separate from the detector; U.S. Pat. No. 3,872,308 to Hopson et al. which relates to a light pipe approach to relaying light energy from a reticle to a separate detector; U.S. Pat. No. 3,944,167 to Figler et al. which shows a multidetector reticle arrangement to sort out a target from decoys; and U.S. Pat. No. 4,561,611 to Sinclair et al. which concerns a fixed target seeker for a spinning projectile in which the reticle and detector are also separate.

DISCLOSURE OF THE INVENTION

The present invention combines the electronic simplicity of the rotating acquisition systems with the wide view field and noise resistance of the array systems by using a refractive telescope (21), placing the reticle (38) directly onto the surface of the detector (34), and shielding (35) the detector (34) from light outside the telescope's field of view. In addition, the invention facilitates acquisition of a target by providing around the reticle an annulus of detector segments (50) so connected as to provide a directional indication for movement of the gimbal (14) when the target image is outside the frequency-modulating inner ring (40) of the reticle (38).

In another aspect of the invention, the reticle (38) also serves as the electrical contacts (44,64) to the detector photodiode (60). In the preferred embodiment of the invention only ten electrical leads to the detector assembly (one for the inner ring (40), eight more for the outer segment (50) annulus and a ground return) are necessary for the full functioning of the apparatus.

DESCRIPTION OF THE PREFERRED EMBODIMENT

Figure 1:
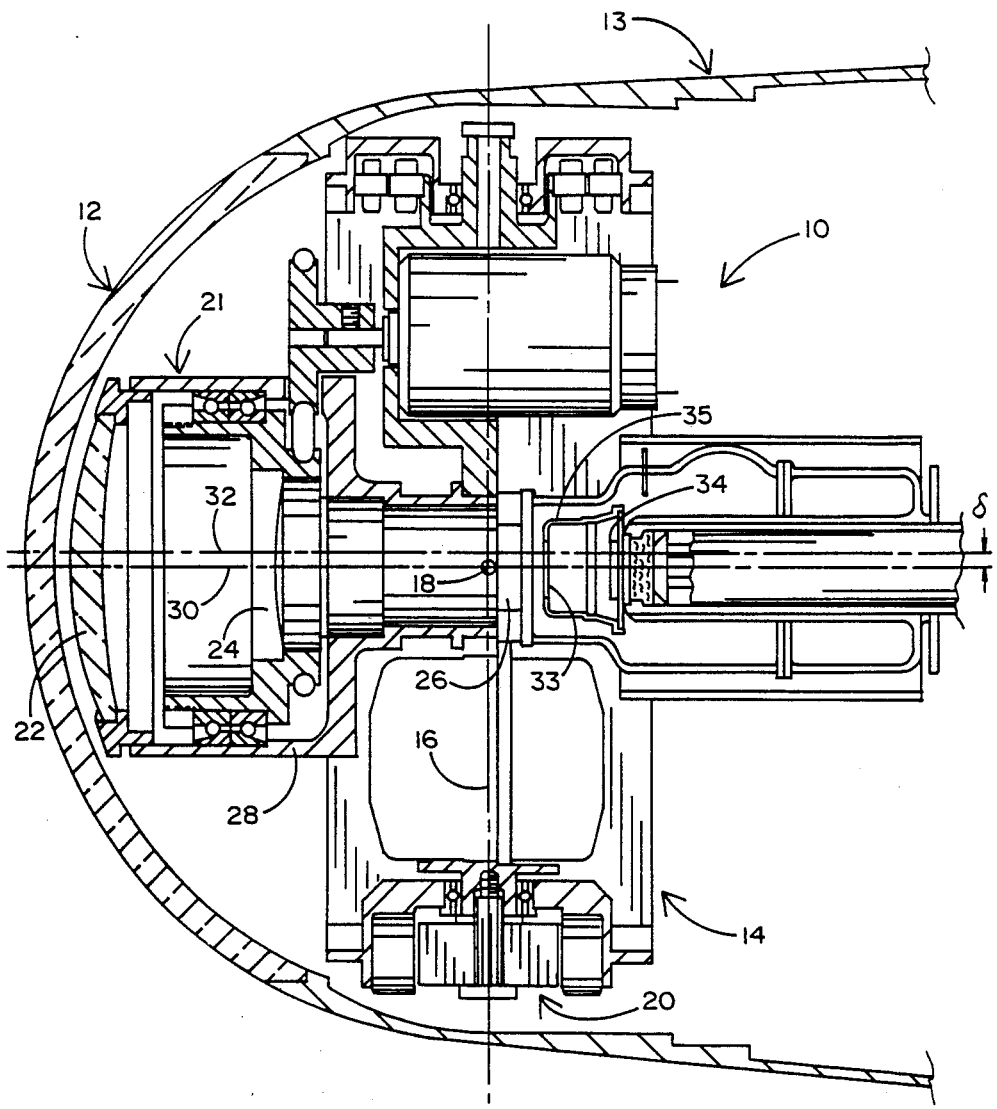
FIG. 1 is a vertical section of the assembly of this invention.

FIG. 1 shows the overall construction of the target acquisition and tracking device 10 of this invention. The device 10 is housed in a transparent dome 12 typically located in the nose 13 of a steerable airborne vehicle (not shown). The device 10 is mounted in the vehicle on a conventional gimbal 14 which is pivotable about orthogonal axes 16, 18 by suitable conventional electrical drivers such as 20.

A refractive telescope 21 composed of lenses 22, 24, 26 whose field of view may subtend an arc of about 45° is mounted on the gimbaled platform 28 for rotation about the platform axis 30 by a motor 31. Due to the wedge action of off-center lens 24, the optical axis 32 of the telescope 21 is parallel to the platform axis 30 but offset therefrom by a distance δ.

The image seen by the telescope 21 is focused through an aperture 33 in an opaque shield 35 on a detector 34 which is mounted on the gimbaled platform 28 perpendicularly to the platform axis 30.

The shield 35 effectively shields the detector 34 from all background or stray radiation except for that which is directly within the field of view of telescope 21, thereby achieving considerable noise reduction.

Figure 2:
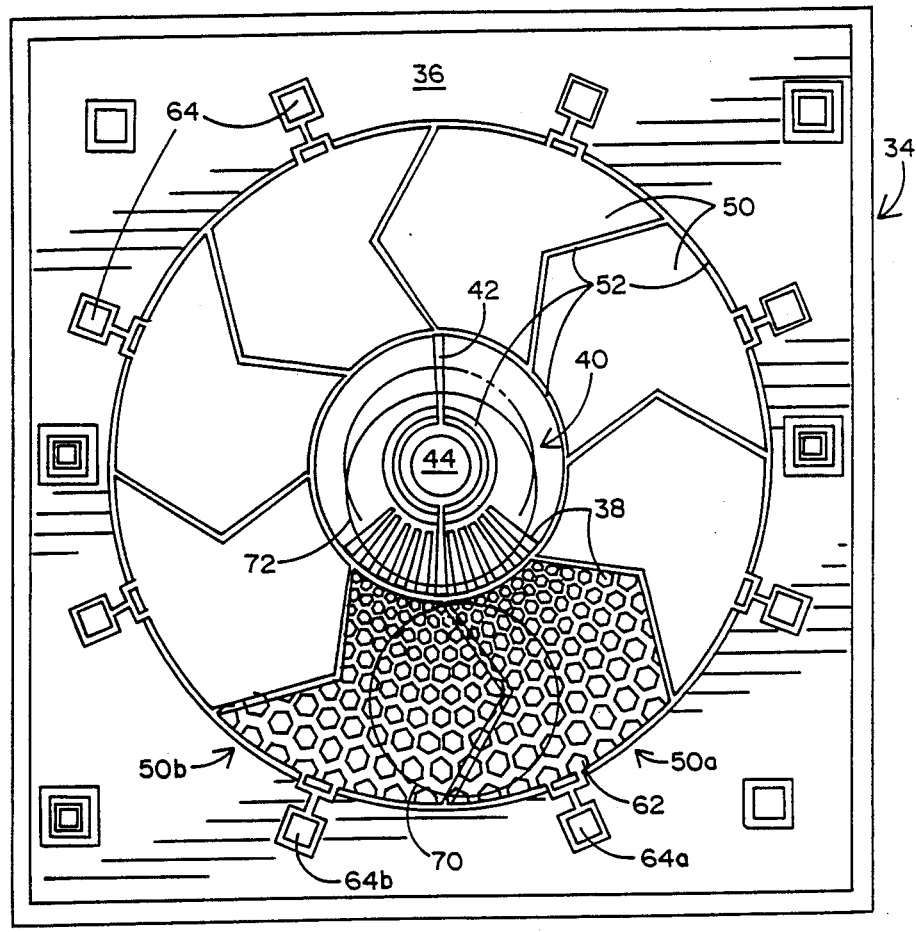
FIG. 2 is a plan view of the detector.
Figure 3:
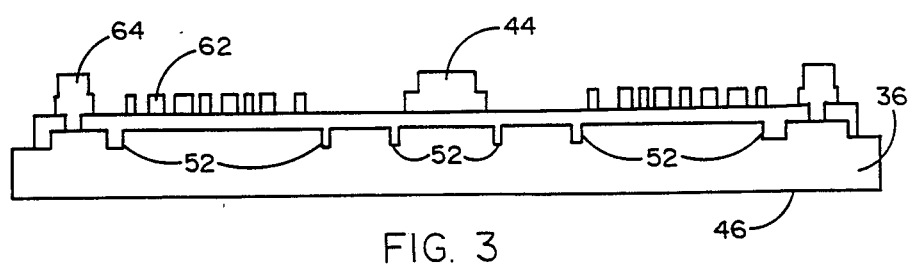
FIG. 3 is a section along line 3—3 of FIG. 2.

The detector 34, shown in detail in FIGS. 2 and 3, consists of a single plate 36 of appropriate photovoltaic semiconductor material covered by a pattern of opaque metallic material which forms the reticle 38.

The pattern of reticle 38 (only a fragment of the circularly uniform pattern is shown in FIG. 2 for clarity) includes an inner ring 40 of radially extending bars. One or more of the bars 42 may advantageously extend into the center of the ring 40 in order to connect to a contact pad 44. Photoelectric signals for the ring 40 appear between the contact pad 44 and the ground contact 46 (FIG. 3) of the detector plate 36.

Figure 4:
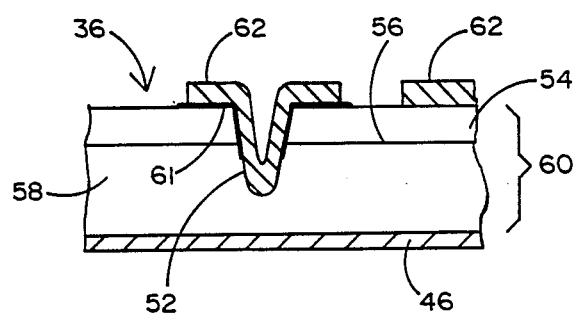
FIG. 4 is a detail section of the segment separation groove.

Surrounding the ring 40 are a number (eight in the preferred embodiment) of detector segments 50 disposed annularly around the ring 40. Each of the segments 50 is electrically isolated from its neighbors and from the ring 40 by a groove 52, best seen in FIG. 4, which cuts through the p-silicon layer 54 and the p-n junction 56 into the n-silicon layer 58 of the photodiode 60 formed within the detector plate 36. The insulation layer 61 prevents shorting of the p-n junction.

At least one of the metallic reticle elements 62 in each of the segments 50 is connected to an appropriate contact pad 64, where the photovoltaic signals generated in that sector can be collected.

In operation, let it first be assumed that the target is substantially away from the platform axis 30. In this condition, as the telescope 21 rotates about the platform axis 30, the target image may describe a circle 70 which may extend over one or (as shown) both of the segments 50a, 50b. An AC signal superimposed upon the uniform DC background radiation signal will consequently appear at contact pads 64a, 64b. The conventional gimbal electronics (not shown) use this signal to tilt the gimbaled platform 28 in a direction appropriate to move the target image toward the ring 40. Eventually, the target image circle produced by the rotation of telescope 21 will be partly on one or both of segments 50a, 50b partly on the ring 40. Finally, with a continued gimbal correction, the image circle reaches a position 72 wholly within the ring 40. When it does, the conventional positioning electronics (not shown) take over to further tilt the platform 28 in response to the frequency modulation caused by any eccentricity of circle 72 until the image circle 72 is concentric with the ring 40 and the frequency of the AC signal at contact pad 44 remains constant.

Because each off-axis target in which the target is outside the ring 40 during any part of the telescope rotation position produces a unique combination of time intervals during which the target image dwells on a given segment 50 of the ring 40 (particularly in view of the angular shape of the boundaries between the outer segments as shown in FIG. 2), the relation of these time intervals can be used to precisely determine the direction and distance of the target from the on-axis position.

It will be understood that the position and line of sight rate of the platform 28 when the target has thus been acquired can be sensed by appropriate conventional electronics (not shown) and used to steer the vehicle in whatever manner may fit the situation.

I claim:

1. An integrated reticle and detector assembly, comprising:
   (a) a gimbaled platform having a platform axis;
   (b) a telescope having an optical axis, said telescope being mounted on said platform for rotation about said platform axis, the optical axis of said telescope being spaced from said platform axis;
   (c) a detector fixedly mounted on said platform to receive images from said telescope; and
   (d) stationary reticle means for obscuring portions of said detector, said reticle means being fixedly positioned with respect to said detector in the optical path of said telescope between said telescope and said detector;
   (e) said detector being divided into an annular central segment and an annulus of separate outer segments, each of said segments being capable of producing a separate output signal when illuminated;
   (f) the center of said central segment being on said platform axis so that the image of a target located on the optical axis of said telescope describes a circle concentric with said central segment upon rotation of said telescope, and
   (g) said outer segments being so positioned as to be illuminated by the image of a target substantially off the optical axis of said telescope,
   (h) whereby said outer segments produce a signal indicative of the direction and distance in which said image is off said optical axis.

2. The assembly of claim 1, in which said segments are located on a common semiconductor substrate.

3. The assembly of claim 1, in which contact pads are formed on said detector, and at least one of said reticle means serves to electrically connect a portion of said detector to one of said contact pads.

4. The assembly of claim 1, in which said telescope is a refractive telescope.

5. The assembly of claim 1, in which said target image traverses at least two of said segments during each rotation of said telescope when said target is substantially off-axis, whereby the off-axis direction of said target can be precisely ascertained.

6. The assembly of claim 1, in which the boundaries between said outer segments include at least two boundary portions at an angle to each other.

* * * * *